UNITED STATES PATENT OFFICE.

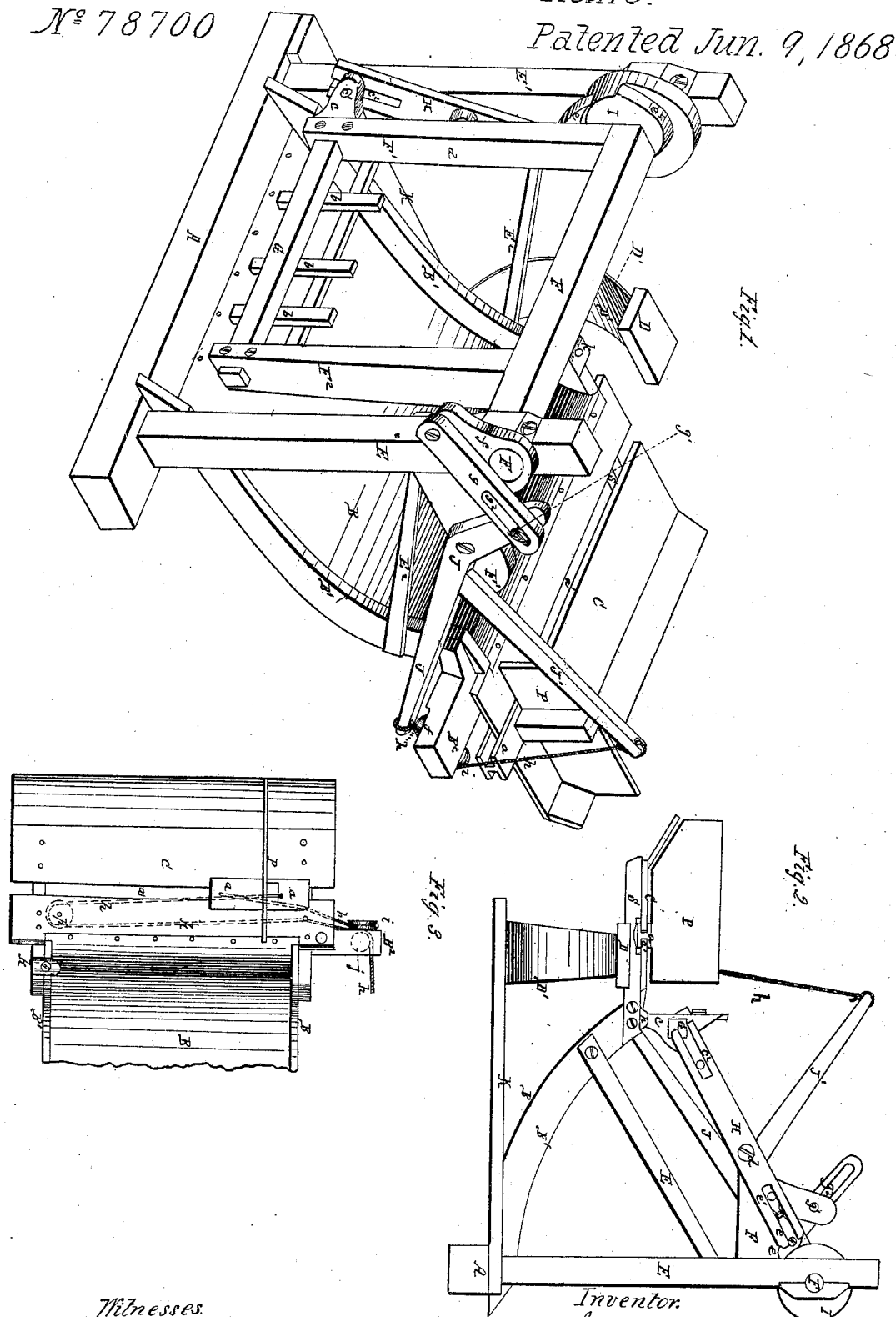

JOHN UNDERWOOD, OF MUSCATINE, IOWA.

IMPROVEMENT IN HARVESTER-RAKES.

Specification forming part of Letters Patent No. 78,700, dated June 9, 1868.

*To all whom it may concern:*

Be it known that I, JOHN UNDERWOOD, of Muscatine, in the county of Muscatine and State of Iowa, have invented certain new and useful Improvements on Rakes and Binding Attachments for Harvesting-Machines; and I do hereby declare that the following is a full, clear, and exact description thereof, reference being had to the accompanying drawings, making a part of this specification, in which—

Figure 1 is a perspective view of the machine as seen from the front grain-side corner thereof. Fig. 2 is an elevation of the inner side of the raking and binding attachment. Fig. 3 is a top view of the upper platform and a portion of the curved grain-receiver.

Similar letters of reference indicate corresponding parts in the several figures.

This invention relates to certain novel improvements on machinery which is designed for being attached to reaping machinery for gathering or reeling in grain to the cutting apparatus, and delivering the grain in gavels in a position where it will be convenient for binding it in gavels by hand previously to discharging the gavels upon the ground.

The invention provides for attaching to a single or double wheel draft-frame a vertically-revolving gathering and raking device, a curved grain-receiver with an elevated platform, and a laterally-reciprocating follower, all of which are so constructed and arranged that during the forward movements of the machine in cutting grain the grain will be pressed up to the cutters, and after being cut it will be moved backward and upward and delivered upon a platform, from which it will be moved laterally toward the inner side of this platform to a position for being bound by hand, as will be hereinafter described.

The invention further provides for locating a stand or seat, or both, for a binder upon the inner end or side of an elevated platform, which has a laterally-reciprocating follower applied to it, and which receives the cut grain from a grain-receiver, which is concentric with the axis of motion of a vertically-revolving combined gatherer and raking device, so that a person sitting or standing in rear of the cutting apparatus will have the cut grain brought to him in a position which will be convenient for him to bind and deliver the bundles upon the ground out of the way of the team in cutting the succeeding swath, as will be hereinafter described.

The invention also provides for automatically moving the rake-teeth of a combined rake and gatherer, which revolves in the path of a vertical plane, and delivers the cut grain upon an elevated platform, so that said teeth will sweep over the grain-receiver in a position perpendicular thereto, and then turn so as to deliver the grain upon said platform, as will be hereinafter described.

To enable others skilled in the art to understand my invention, I will describe its construction and operation.

In the accompanying drawings, A represents a finger-bar of a reaping-machine, which may be attached, in any suitable manner, to a draft-frame having either one or two transporting-wheels. The fingers and sickle are not represented in the drawings, for the reason that these parts may be constructed in any well-known manner.

Upon this finger-bar A, and at or near the extremities thereof, two posts, E E', are erected perpendicularly, which are suitably braced and adapted for sustaining a rotary shaft, F, carrying a combined grain gatherer and rake, which will be hereinafter described. To this finger-bar A a grain-receiver, B, is suitably secured, which extends backward and upward, and is concentric with the axis of motion of the rake and gatherer shaft F, as shown in Figs. 1 and 2. This grain-receiver is provided on both sides with raised fenders or grain-guards B¹ B¹, which may be parallel to each other, or they may diverge toward the finger-bar, so that the concave grain-receiver B may be somewhat wider at its front end than it is at its rear elevated end.

By making the grain-receiver B concave and concentric with the axis of the shaft F, as described, I accomplish two very important objects, viz: I am enabled to employ a very simple rake and gatherer, which will, during a part of its revolution, carry the cut grain backward a proper distance in rear of the finger-bar, and at the same time elevate the grain and deliver it upon a platform at a proper height to have it conveniently handled by a binder located upon a seat, D.

To the rear ends of the curved fenders or grain-guards B¹ B¹ of the concave receiver B two arms, S, are rigidly secured, which project backward horizontally, and serve as supports upon which to secure a platform, C. This platform C is parallel to the finger-bar A, and it is provided with a follower, P, which receives an intermittent reciprocating movement across it at right angles to the line of draft.

The follower P is a board erected perpendicularly to the platform C, and suitably secured to a grooved slide, $a$, which works in a slot, $a'$. This follower receives its movements from the shaft F, through certain means, hereinafter explained, so that after a quantity of grain is delivered by the rake upon the platform C, and while the rake is passing over to commence another backward movement, the said follower will be caused to move the grain toward the binders' seat D, and then return to its former position at the outer or grain end of the said platform, ready to make another stroke at the proper time.

Before describing the means for giving the intermittent movements to the follower P, I will describe the construction and operation of the combined gatherer and rake.

Two arms, $F^1$ $F^2$, are secured to the shaft F, which arms are parallel to each other and at right angles to their shaft. They are made of sufficient length to extend nearly to the surface of the concave grain-receiver while passing over it. The outer extremities of these arms are connected together by means of a rocking bar, G, to which rake-teeth $b\ b$ are secured in a suitable manner.

On one end of the bar G an arm, $c$, is secured, from which a pin, $c^1$, projects and plays in a slot, $c^2$, which is made in one end of a vibrating lever, H. This lever H is pivoted at $d$ to the arm $F^1$, outside thereof, and is vibrated at proper times by a toe, $e$, and cam $e^4$, which latter is affixed permanently to a disk, I, on the post $E'$. (Shown clearly in Fig. 1.) The toe $e$ has a stud, $e^1$, projecting from it, which plays in a slot, $e^2$, made in said lever H.

It is important to have the rake-teeth $b$ perpendicular to the concave grain-receiver B while sweeping backward over it, and also to have said rake-teeth turn up, as shown in Fig. 2, when they are in the act of discharging grain from the receiver B upon the platform C. The latter movement is given to the teeth by an offset, $k$, on the inner grain-guard $B^1$, against which a toothed projection, $b'$, of the arm $c$ strikes when the rake is in a position for delivering its load.

Just before the rake commences to descend into the standing grain the toe $e$ is brought in contact with its cam-surface $e^4$, and moved so as to act through lever H upon the rake and bring its teeth back to a raking condition again. The rake then operates, for a short portion of its backward stroke, as a reel or gatherer, and presses back the standing swath to be cut.

To the outer end of the shaft F a short arm, $f$, is keyed, and to this arm a slotted link, $g$, is pivoted, which is connected by a pin, $g^1$, passing through its oblong slot $g^2$ to the short arm of a bifurcated lever, J J'. This lever is pivoted to the side of a rear extension, $F^1$, of the post E, as shown in Fig. 1.

The rear extremity of the lower arm J' has a rope or chain, $h$, attached to it, which is carried around a grooved pulley, $j$, on the extension $B^2$ of platform C, thence beneath this platform to and around a pulley, $p$, and thence back again to the grooved slide $a$, to the bottom of which the chain is securely fastened. The rear extremity of the upper arm J' has a chain, $h'$, attached to it, which chain is carried beneath a pulley, $i$, on extension $B^2$, and thence under platform C to the slide $a$, and fastened thereto.

The slotted link $g$, the bifurcated lever J J', and their connections, with the slide $a$ of the follower P, are so adjusted with relation to the movements of the rake and gatherer that immediately succeeding the delivery of a load of grain upon the platform C, and while this rake is ascending, the link $g$ will cause the bifurcated lever to move the follower P across its platform toward the inner side thereof; then, while the rake is descending into the standing swath in front of the finger-bar, the said follower will be moved back again to the outer end or side of its platform C.

The slot $g^2$, through the link $g$, is made long enough to allow the rake to complete its raking stroke over the grain-receiver B, discharge its load upon the platform C, and then rise out of the way before this link commences to operate the bifurcated lever.

The binders' seat D is mounted upon a spring-standard, $D'$, which is secured to a beam or platform, K, extending back from the inner end of the finger-bar A, as shown in Figs. 1 and 2. This seat is sufficiently elevated above the plane of the finger-bar to allow a person to rest conveniently while binding the grain upon the platform C.

Having described my invention, what I claim as new, and desire to secure by Letters Patent, is—

1. The combination of a revolving rake and gatherer, a concave grain-receiver, B, a rear elevated platform, C, a reciprocating follower, P, and a binders' support, K or D, operating substantially in the manner and for the purposes described.

2. The revolving rake and gatherer, with its teeth applied to a rocking bar, in combination with the devices described and shown, for causing the teeth to assume, in their circuit, the different positions required, and with a concave grain-receiver, substantially as and for the purpose described.

3. The binders' support K, which is attached to the finger-bar, in combination with the elevated platform C and reciprocating follower P, substantially as described.

JOHN UNDERWOOD.

Witnesses:
 F. L. UNDERWOOD,
 I. B. NEGLEY.